(12) United States Patent
Diaz et al.

(10) Patent No.: US 9,593,594 B2
(45) Date of Patent: Mar. 14, 2017

(54) METHOD AND APPARATUS FOR DECONGEALING A LUBRICATING FLUID IN A HEAT EXCHANGER APPARATUS

(71) Applicant: General Electric Company, Schenectady, NY (US)

(72) Inventors: Carlos Enrique Diaz, Garching bei Munich (DE); William Dwight Gerstler, Niskayuna, NY (US); Michael Ralph Storage, Beavercreek, OH (US)

(73) Assignee: General Electric Company, Schenectady, NY (US)

( * ) Notice: Subject to any disclaimer, the term of this patent is extended or adjusted under 35 U.S.C. 154(b) by 289 days.

(21) Appl. No.: 14/502,750

(22) Filed: Sep. 30, 2014

(65) Prior Publication Data

US 2016/0090863 A1 Mar. 31, 2016

(51) Int. Cl.
*F01D 25/18* (2006.01)
*F28D 20/00* (2006.01)
*F02C 7/00* (2006.01)

(52) U.S. Cl.
CPC ............... *F01D 25/18* (2013.01); *F02C 7/00* (2013.01); *F28D 20/003* (2013.01)

(58) Field of Classification Search
CPC ........... F01D 25/18; F02C 7/00; F28D 20/003
USPC .................... 60/39.1; 165/104.12, 104.21
See application file for complete search history.

(56) References Cited

U.S. PATENT DOCUMENTS

| 2,404,168 | A | * | 7/1946 | Geddes | F16N 39/02 |
| | | | | | 165/297 |
| 2,435,359 | A | | 2/1948 | Landis | |
| 2,449,922 | A | | 9/1948 | Andersen | |
| 2,469,316 | A | | 5/1949 | Shaw | |
| 2,480,120 | A | | 8/1949 | Cruzan | |
| 2,482,806 | A | | 9/1949 | Stahn | |
| 2,531,411 | A | | 11/1950 | Davenport | |
| 2,677,243 | A | | 5/1954 | Telkes | |

(Continued)

FOREIGN PATENT DOCUMENTS

| EP | 0101256 B1 | 1/1989 |
| EP | 0365609 B1 | 8/1993 |

(Continued)

*Primary Examiner* — Steven Sutherland
(74) *Attorney, Agent, or Firm* — John P. Darling

(57) ABSTRACT

A decongealing channel for use in a heat exchanger apparatus, including a supersaturated solution contained therein and an actuation component in fluid communication with a lubricating fluid coupled to the decongealing channel. The actuation component is responsive to a change in pressure exerted thereon by the lubricating fluid so as to actuate an exothermic response in the supersaturated solution. The heat exchanger apparatus is disposed in a bypass fan duct of an aircraft engine. The heat exchanger apparatus including a manifold portion, one or more flow through openings extending therethrough the manifold portion to define one or more flow through channels having contained therein the lubricating fluid. In addition, the manifold portion including one or more additional openings extending therethrough to define one or more decongealing channels. Further disclosed is an engine including the heat exchanger apparatus and a method of decongealing a lubricating fluid in the heat exchanger apparatus.

20 Claims, 9 Drawing Sheets

(56) References Cited

U.S. PATENT DOCUMENTS

| | | | |
|---|---|---|---|
| 2,677,664 A | 5/1954 | Telkes | |
| 2,729,095 A | 1/1956 | Greer | |
| 2,936,741 A | 5/1960 | Telkes | |
| 3,093,308 A | 6/1963 | Snelling | |
| 3,951,127 A | 4/1976 | Watson et al. | |
| 4,295,517 A | 10/1981 | Guex et al. | |
| 4,296,801 A | 10/1981 | Guex et al. | |
| 4,574,051 A * | 3/1986 | Matthews | C09K 5/063 165/10 |
| 4,795,580 A | 1/1989 | Hormansdorfer | |
| 4,860,729 A | 8/1989 | Benson et al. | |
| 5,552,961 A * | 9/1996 | Van Gaal | H05K 7/2049 165/104.21 |
| 7,814,870 B2 | 10/2010 | Shikida et al. | |
| 7,883,053 B2 | 2/2011 | Zielinski et al. | |
| 8,161,920 B2 | 4/2012 | Hayashi et al. | |
| 2005/0167079 A1 | 8/2005 | Zhang | |
| 2008/0095611 A1 | 4/2008 | Storage et al. | |
| 2012/0125594 A1 | 5/2012 | Elder | |
| 2013/0160460 A1 | 6/2013 | Dalton et al. | |
| 2014/0202158 A1* | 7/2014 | Storage | F02C 7/12 60/722 |

FOREIGN PATENT DOCUMENTS

| | | |
|---|---|---|
| EP | 1918577 A1 | 5/2008 |
| JP | 11182393 A | 7/1999 |
| WO | 8505440 A1 | 12/1985 |
| WO | 8701275 A1 | 3/1987 |
| WO | 8701716 A1 | 3/1987 |
| WO | 8908228 A1 | 9/1989 |

* cited by examiner

METHOD AND APPARATUS FOR DECONGEALING A LUBRICATING FLUID IN A HEAT EXCHANGER APPARATUS

BACKGROUND

This invention relates generally to gas turbine engines and methods and apparatus for decongealing lubricating or fuel fluids in a heat exchanger apparatus in such engines.

Aviation engines use fluids, such as oil or fuel, to dissipate heat from engine components, such as engine bearings, electrical generators, and the like. Heat is typically rejected from the fluid to air by heat exchanger assemblies, such as fuel cooled oil cooler or air cooled surface oil coolers, to maintain oil temperatures at a desired ~100° F.<T<300° F. In many instances an environment in which the engine may be operated may be as low as −65° F. Problems begin to occur when the engine is in an engine shut down occurrence in the low temperature condition. The oil within the heat exchanger apparatus begins to cool and may become very viscous. As a result, due to the high viscosity of the oil, it does not flow through the heat exchanger apparatus and requires a lengthy period of time to heat up the oil to a desired viscosity for flowing through the heat exchanger apparatus.

Known heat exchanger assemblies have included oil ducts having increased diameter sizing in an attempt to allow for the continued flow of oil therethrough the assembly when operating during low temperature conditions. While these increased diameter ducts may provide for an increase or allowance in flow during low temperature conditions, the ducts are often oversized for normal operating conditions. In addition, these increased diameter ducts are cause of extra weight and bulk to the engine during all conditions of flight.

It would therefore be desirable to provide a robust method and apparatus for maintaining sufficient heating to a lubricating fluid, such as oil, passing through a heat exchanger apparatus during low temperature conditions for an aviation engine that addresses the above issues.

BRIEF SUMMARY

These and other shortcomings of the prior art are addressed by the present disclosure, which provides a method and apparatus for de-congealing a fluid in heat exchanger apparatus.

In accordance with embodiment, provided is a decongealing channel for use in a heat exchanger apparatus. The decongealing channel including a decongealing channel body enclosing therein a supersaturated solution; an actuation component coupled to the decongealing channel body and in fluid communication with a lubricating fluid. The actuation component is responsive to a change in a fluid pressure exerted thereon by the lubricating fluid so as to actuate an exothermic response in the supersaturated solution.

In accordance with another embodiment, provided is a heat exchanger apparatus for use in an oil cooling system of an aircraft engine. The heat exchanger apparatus includes a manifold portion, one or more flow through openings enclosed by the manifold portion, one or more additional openings enclosed by the manifold portion and defining one or more decongealing channels. The manifold portion including a radially inner surface and a radially outer surface, an upstream wall and an opposite downstream wall. The one or more flow through openings are enclosed by the manifold portion and extending therethrough. The one or more flow through openings defining the one or more flow through channels having contained therein a lubricating fluid. The one or more additional openings are enclosed by the manifold portion and extending therethrough. The one or more additional openings defining one or more decongealing channels. The decongealing channel comprising a decongealing channel body enclosing therein a supersaturated solution and an actuation component coupled to the decongealing channel body and in fluid communication with the lubricating fluid, the actuation component responsive to a change in a fluid pressure exerted thereon by the lubricating fluid so as to actuate an exothermic response in the supersaturated solution.

In accordance with another embodiment, provided is an engine. The engine includes a fan assembly, a core engine downstream of the fan assembly, a fan casing substantially circumscribing the fan assembly, a booster casing substantially circumscribing the core engine such that a bypass duct is defined between the fan casing and the booster casing and an arcuate heat exchanger apparatus coupled to one of the fan casing or the booster casing. The arcuate heat exchanger including a manifold portion, one or more flow through openings enclosed by the manifold portion and extending therethrough, and one or more additional openings enclosed by the manifold portion and extending therethrough. The manifold portion including a radially inner surface and a radially outer surface, an upstream wall and an opposite downstream wall. The one or more flow through openings defining one or more flow through channels having contained therein a lubricating fluid. The one or more additional openings defining one or more decongealing channels, each of the one or more decongealing channels. The one or more decongealing channels including a decongealing channel body enclosing therein a supersaturated solution and an actuation component coupled to the decongealing channel body and in fluid communication with the lubricating fluid, the actuation component responsive to a change in a fluid pressure exerted thereon by the lubricating fluid so as to actuate an exothermic response in the supersaturated solution.

In accordance with yet another embodiment, provided is a method of decongealing a lubricating fluid in a heat exchanger apparatus. The method including actuating an exothermic reaction in a supersaturated solution contained within a decongealing channel as a result of a rise in pressure of a congealed lubricating fluid impinging thereon an actuation component. Next, generated heat is conducted by the exothermic reaction from within the decongealing channel to a congealed lubricating fluid disposed in an adjacent flow through channel. After dissipation of heat, the actuation component is returned to a home position and the supersaturated solution to a metastable state as the congealed lubricating fluid decongeals and decreases in pressure.

Other objects and advantages of the present disclosure will become apparent upon reading the following detailed description and the appended claims with reference to the accompanying drawings.

BRIEF DESCRIPTION OF THE FIGURES

These and other features, aspects, and advantages of the present disclosure will become better understood when the following detailed description is read with reference to the accompanying drawings in which like characters represent like parts throughout the drawings, wherein.

Corresponding reference characters indicate corresponding parts throughout the several views of the drawings.

DETAILED DESCRIPTION

Figure 1:
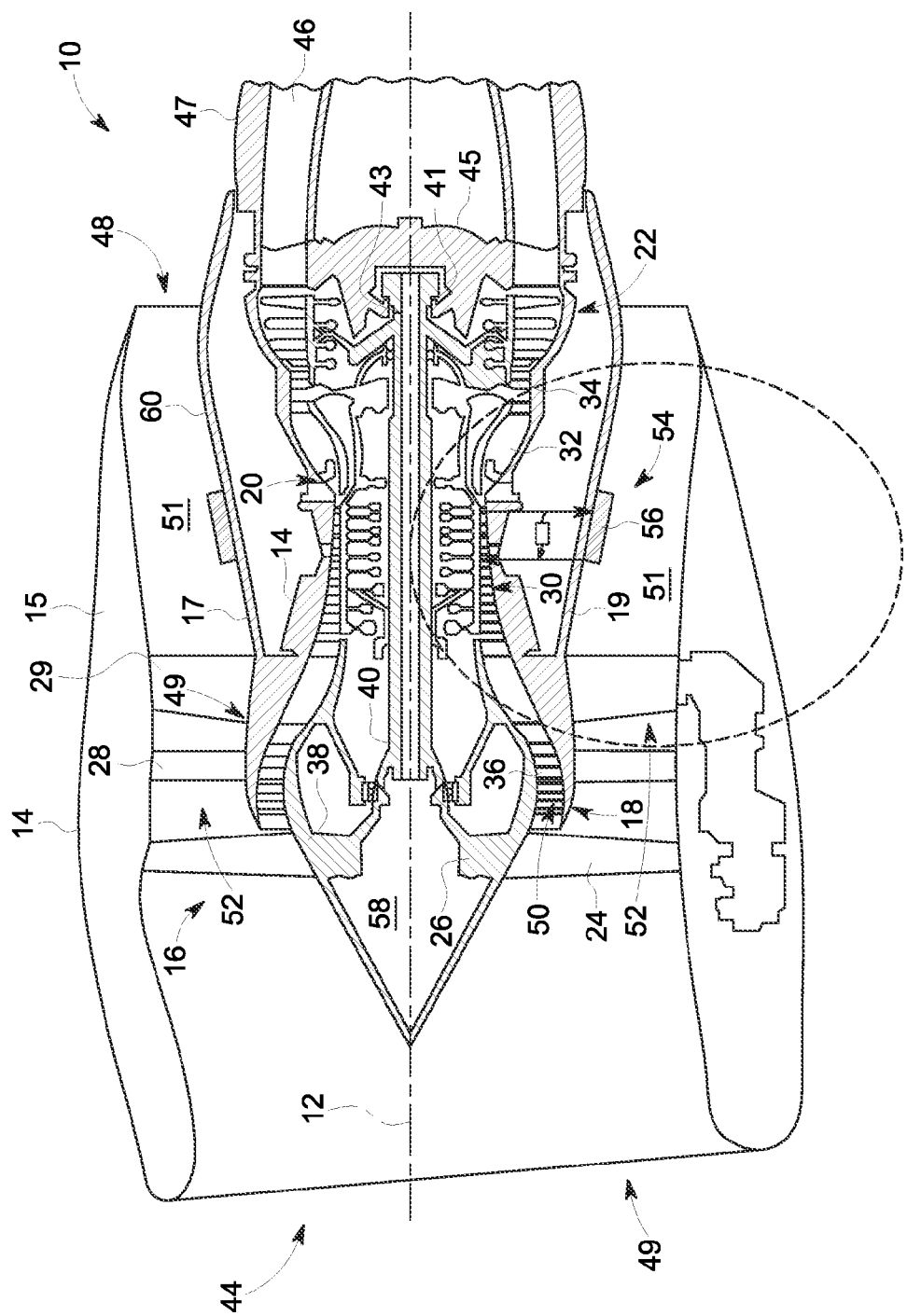
FIG. 1 is a schematic longitudinal cross-section of portion of an aircraft engine including a heat exchanger apparatus, in accordance with one or more embodiments shown or described herein.

The present disclosure will be described for the purposes of illustration only in connection with certain embodiments; however, it is to be understood that other objects and advantages of the present disclosure will be made apparent by the following description of the drawings according to the disclosure. While preferred embodiments are disclosed, they are not intended to be limiting. Rather, the general principles set forth herein are considered to be merely illustrative of the scope of the present disclosure and it is to be further understood that numerous changes may be made without straying from the scope of the present disclosure.

Preferred embodiments of the present disclosure are illustrated in the figures with like numerals being used to refer to like and corresponding parts of the various drawings. It is also understood that terms such as "top", "bottom", "outward", "inward", and the like are words of convenience and are not to be construed as limiting terms. It is to be noted that the terms "first," "second," and the like, as used herein do not denote any order, quantity, or importance, but rather are used to distinguish one element from another. The terms "a" and "an" do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity).

Embodiments disclosed herein relate to a heat exchanger apparatus including one or more decongealing channels for fluid decongealing in a cooling system of an aircraft engine, such as an oil cooling or fuel cooling system. In contrast to known means of heating fluids in a heat exchanger apparatus, the decongealing channel as disclosed herein provides for an inexpensive and reliable means for heating fluids in a cold operating condition without the need for an external source of energy. The heat exchanger apparatus including one or more decongealing channels as disclosed herein is configured to weigh and cost less than known means that provide for the flow of congealed fluids, such as larger diameter pipes, or the like. In addition, the disclosed novel decongealing channel minimizes the weight and cost of the overall heat exchanger apparatus. Accordingly, disclosed is the inclusion of a decongealing channel that provides for decongealing of a lubricating fluid in a heat exchanger apparatus, such as an air or fuel cooled oil cooler, for an aviation engine.

The heat exchanger apparatus including one or more decongealing channels introduces a novel concept for passively providing for the decongealing of fluids, such as oil, during cold operating conditions in an aviation engine, such as an aircraft engine. The heat exchanger apparatus including one or more decongealing channels could be used also in a land based gas turbine. The disclosed decongealing channel, heat exchanger apparatus including one or more decongealing channels and method are additionally anticipated for use in any cooling system within aviation or land based engine (e.g. the cooling oil for the electrical generator of an aircraft engine or the lubrication oil of the aircraft engine). The decongealing channel is configured to include a closed volume of a supersaturated solution in the proximity of the congealed fluid flowing through adjacent channels in the cooling system. The supersaturated solution is during normal operating conditions in a metastable state that will crystallize and generate heat in response to a change in fluid temperature and fluid pressure in the cooling system during operating or start up conditions. More specifically, a change in fluid temperature and fluid pressure will drive the position of an actuation means in the decongealing channel as required by the cooler operating concept, so as to provide for heat to nearby channels and decongealing of fluid, such as oil, passing therethrough. It is anticipated by this disclosure that the disclosed decongealing channel is described in conjunction with an oil cooling system, but may also be applied to any other cooling fluid system (e.g. fuel cooled, hydraulic fluid or water systems) that undergo a similar increase in pressure during operation in a cold condition so as to provide actuation of the heating process within the channel, and not limited to the example oil cooled system described herein.

Figure 2:
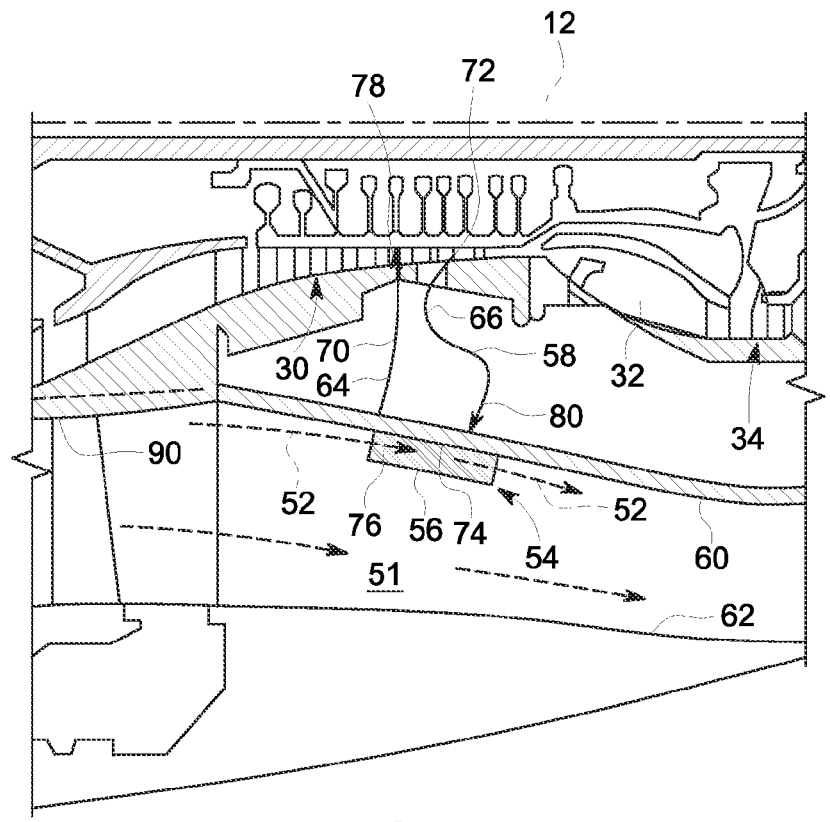
FIG. 2 is a schematic longitudinal cross-section of portion of the aircraft engine of FIG. 1, including the heat exchanger apparatus, in accordance with one or more embodiments shown or described herein.

Referring to the drawings wherein identical reference numerals denote the same elements throughout the various views, FIGS. 1 and 2 depict a schematic illustration of an exemplary aircraft engine assembly 10. It is noted that the portion of the engine assembly 10, illustrated in FIG. 2, is indicated by dotted line in FIG. 1. The engine assembly 10 has a longitudinal center line or axis 12 and an outer stationary annular fan casing 14 disposed concentrically about and coaxially along the axis 12. In the exemplary embodiment, the engine assembly 10 includes a fan assembly 16, a booster compressor 18, a core gas turbine engine 20, and a low-pressure turbine 22 that may be coupled to the fan assembly 16 and the booster compressor 18. The fan assembly 16 includes a plurality of rotor fan blades 24 that extend substantially radially outward from a fan rotor disk 26, as well as a plurality of structural strut members 28 and outlet guide vanes ("OGVs") 29 that may be positioned downstream of the rotor fan blades 24. In this example, separate members are provided for the aerodynamic and structural functions. In other configurations, each of the OGVs 29 may be both an aerodynamic element and a structural support for an annular fan casing (described presently).

The core gas turbine engine 20 includes a high-pressure compressor 30, a combustor 32, and a high-pressure turbine 34. The booster compressor 18 includes a plurality of rotor blades 36 that extend substantially radially outward from a compressor rotor disk 38 coupled to a first drive shaft 40. The high-pressure compressor 30 and the high-pressure turbine 34 are coupled together by a second drive shaft 41. The first and second drive shafts 40 and 41 are rotatably mounted in bearings 43 which are themselves mounted in a fan frame 45 and a turbine rear frame 47. The engine assembly 10 also includes an intake side 44, defining a fan intake 49, a core engine exhaust side 46, and a fan exhaust side 48.

During operation, the fan assembly 16 compresses air entering the engine assembly 10 through the intake side 44. The airflow exiting the fan assembly 16 is split such that a portion 50 of the airflow is channeled into the booster compressor 18, as compressed airflow, and a remaining portion 52 of the airflow bypasses the booster compressor 18 and the core gas turbine engine 20 and exits the engine assembly 10 via a bypass duct 51, through the fan exhaust side 48 as bypass air. More specifically, the bypass duct 51 extends between an interior wall 15 of the fan casing 14 and an outer wall 17 of a booster casing 19. This portion 52 of the airflow, also referred to herein as bypass air flow 52, flows past and interacts with the structural strut members 28, the outlet guide vanes 29 and a heat exchanger apparatus (described presently). The plurality of rotor blades 24 compress and deliver the compressed airflow 50 towards the core gas turbine engine 20. Furthermore, the airflow 50 is further compressed by the high-pressure compressor 30 and is delivered to the combustor 32. Moreover, the compressed airflow 50 from the combustor 32 drives the rotating high-pressure turbine 34 and the low-pressure turbine 22 and exits the engine assembly 10 through the core engine exhaust side 46.

As previously noted, in certain presently available commercial engines heat exchanger apparatus are employed including a surface oil cooler or a generic air cooled oil cooler. In accordance with exemplary aspects of the present technique, a novel heat exchanger apparatus 54 is presented. More particularly, the exemplary apparatus 54 may be configured to address the heat exchange requirements of a turbomachine such as an aircraft engine and provide for decongealing of a lubricating fluid, such as oil, in the apparatus 54 in extreme cold operating environments, for example. Hereinafter, the term "heat exchanger" may be used to refer to the apparatus 54 configured to facilitate cooling of the turbomachine. Furthermore, in an embodiment, the heat exchanger apparatus 54 may be configured as an air-cooled oil cooler (ACOC) a fuel-cooled oil cooler (FCOC), or any other heat exchanger using a heat transfer fluid or the like. The concept disclosed herein is also applicable to any type of aircraft engine (e.g. piston, electric, etc.) including a heat exchange apparatus.

Figure 3:
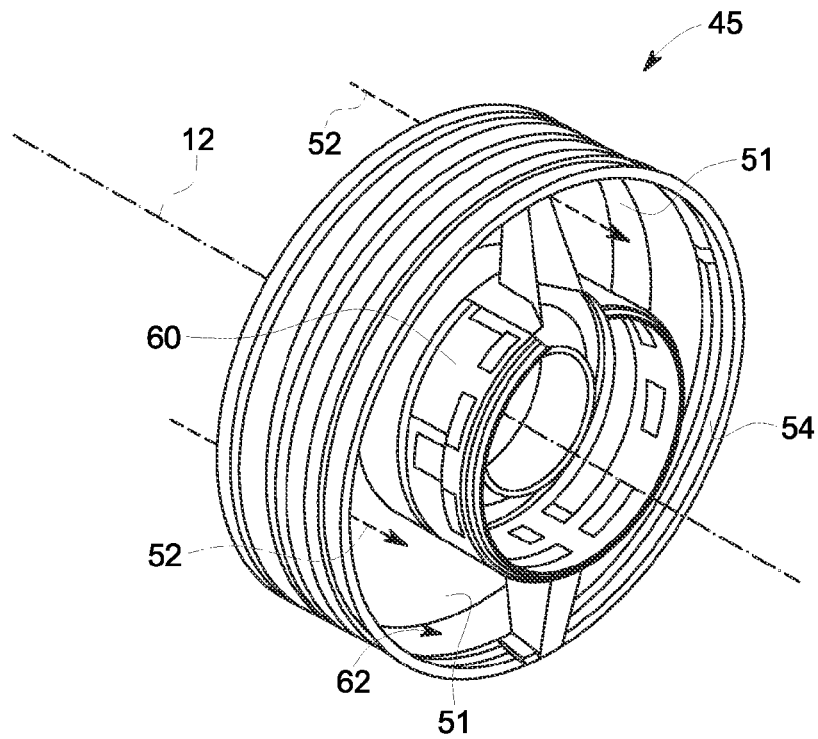
FIG. 3 is a schematic isometric view of an embodiment of a fan frame including a heat exchanger apparatus, in accordance with one or more embodiments shown or described herein.
Figure 4:
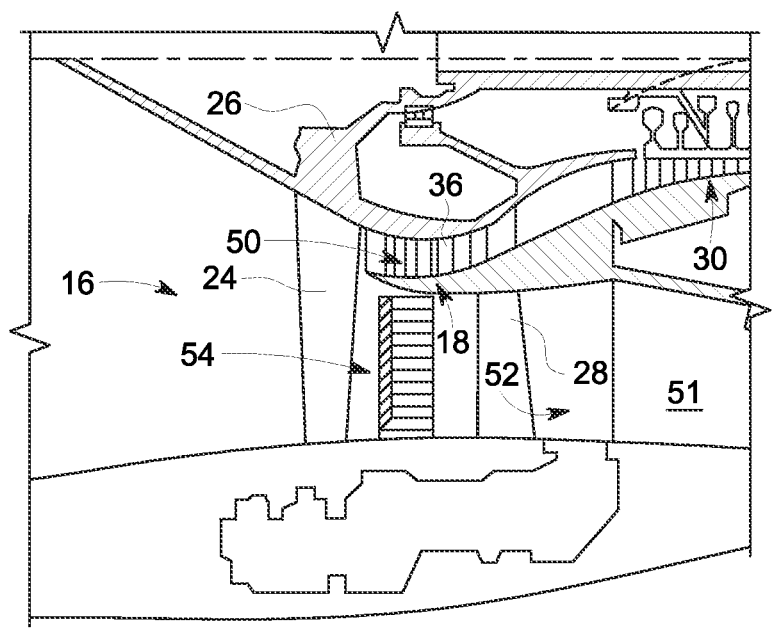
FIG. 4 is a schematic longitudinal cross-section of portion of an aircraft engine, including the heat exchanger apparatus, in accordance with one or more embodiments shown or described herein.

Referring more specifically to FIG. 2, illustrated is a schematic longitudinal cross-section of portion of the aircraft engine of FIG. 1, including the heat exchanger apparatus 54 including one or more decongealing channels (described presently) in greater detail. As illustrated, in the embodiment of FIGS. 1 and 2, the heat exchanger apparatus 54 is mounted to an interior surface 60, relative to axis 12, of the volume that defines the bypass duct 51 downstream of the strut members 28. In an alternate embodiment, as best illustrated in FIG. 3 and described presently, the heat exchanger apparatus 54 may be mounted to the exterior surface 62, relative to the axis 12, of the volume that defines the bypass duct 51. In yet still another embodiment, as best illustrated in FIG. 4 and described presently, the heat exchanger apparatus 54 may be disposed between the fan assembly 16 and upstream of the strut members 28.

During operation, portion 52 of the bypass airflow, flows past and interacts with the heat exchanger apparatus 54. As best illustrated in FIG. 2, during operation, hot lubricating fluid 64, and in this particular embodiment hot engine oil, is directed to the heat exchanger apparatus 54 via a first passage 66 and cooled lubricating fluid 64, and in this particular embodiment cooled engine oil, is directed back to the engine 10 via a second passage 70. In an embodiment, the first passage 66 may be connected on one side to a fluid outlet 72 of an engine block, or the like, and on the other side to a fluid inlet 74 of the heat exchanger 54. In addition, the second passage 70 is connected on one side to a fluid outlet 76 of the heat exchanger apparatus 54 and on the other side to a fluid inlet 78 of the engine block, or the like. In an alternate embodiment, the cooling system includes a lubricating fluid supply source (not shown) and one or more pumps which circulate the lubricating fluid to one or more bearings and to a gearbox and return the hot lubricating fluid to the lubricating fluid supply source via the heat exchanger apparatus 54 which cools it to a lower temperature.

As previously indicated in the illustrated embodiments, during normal operating conditions, heat is rejected from the hot lubricating fluid 64 to air (or alternatively another surrounding fluid) by the heat exchanger apparatus 54 to maintain fluid temperatures at a desired ~100° F.<T<300° F. In the presence of a cold operating condition, such as during engine shut down in an extreme cold environment, such as for example approximately −65° F., the lubricating fluid passing therethrough the heat exchanger apparatus 54 begins to congeal, exhibits a high viscosity and increase in pressure upon startup of the engine. As a result the lubricating fluid must be heated to decongeal the lubricating fluid, lower the viscosity and decrease the pressure, and allow the lubricating fluid to start flowing through the channels (described presently) of the heat exchanger apparatus 54. Accordingly, one or more decongealing channels (not shown) are positioned within the novel heat exchanger apparatus 54 disclosed herein.

In an exemplary embodiment, the heat exchanger apparatus 54 is a conformal air-cooled heat exchanger that is positioned within the bypass duct 51. Optionally, the heat exchanger apparatus 54 may be utilized in a wide variety of applications on or off the engine. More specifically, although in one embodiment the heat exchanger apparatus 54 may be described as configured to cool lubricating fluid for engine bearings, it may alternatively or simultaneously cool other fluids. For example, it may cool a fluid used to extract heat from generators or actuators used on the engine. It may also be used to cool fluids which extract heat from electronic apparatus such as engine controls. In addition to cooling a wide variety of fluids utilized by a gas turbine engine assembly, it should be realized that the heat exchanger apparatus 54, and the methods described herein illustrate that the heat exchanger apparatus 54 may also cool an apparatus that is mounted on the airframe, and not part of the engine. In other applications, the heat exchanger apparatus 54 may be mounted remotely from the gas turbine engine, for example on an external surface of the aircraft. Moreover, the heat exchanger apparatus 54 may be utilized in a wide variety of other applications to either cool or heat various fluids channeled therethrough.

Figure 5:
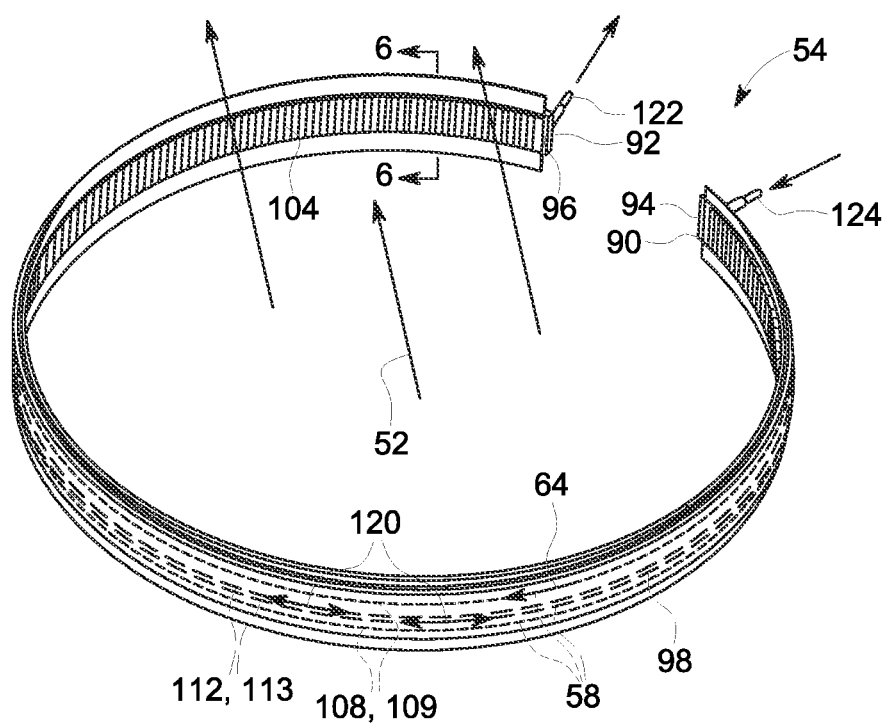
FIG. 5 is a perspective view of an exemplary arcuate heat exchanger apparatus that may be utilized with the gas turbine engine shown in FIGS. 1-4, in accordance with one or more embodiments shown or described herein.
Figure 6:
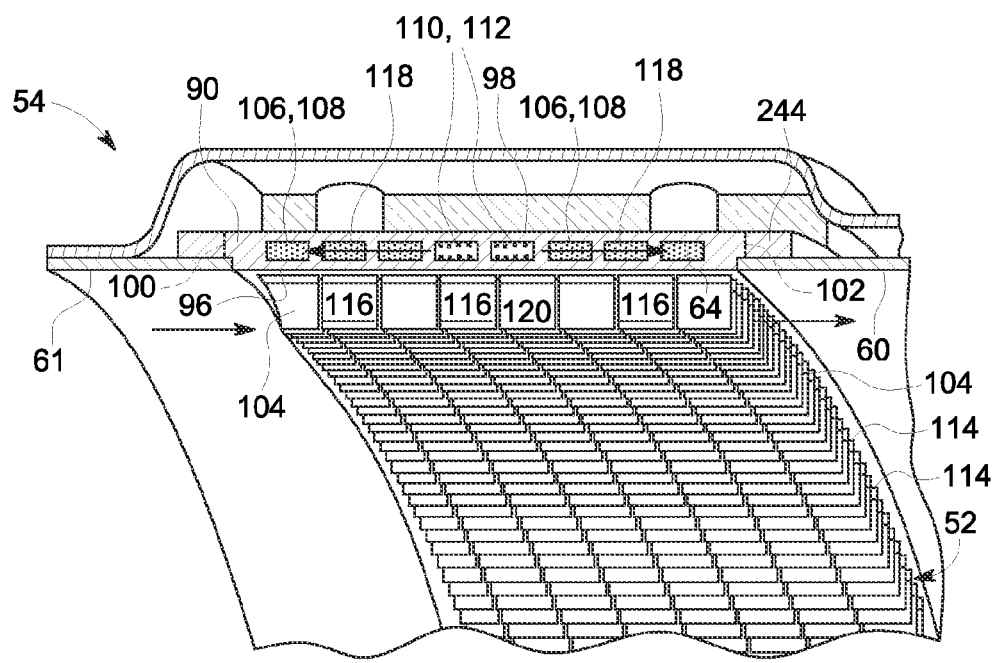
FIG. 6 is a partial isometric cross-sectional view of the heat exchanger apparatus shown in FIG. 5, taken through line 6-6, in accordance with one or more embodiments shown or described herein.

Referring now to FIG. 5 illustrated is a perspective view of the heat exchanger apparatus 54 of FIGS. 1-4 showing a plurality of fluid channels 58 passing therethrough and shown in hidden line. FIG. 6 is a partial cross-sectional view of the heat exchanger apparatus 54 taken through line 6-6 of FIG. 5. In the exemplary embodiment, during assembly, the heat exchanger apparatus 54 is bent such that the heat exchanger apparatus 54 has a circumferential and axial profile that is substantially similar to the circumferential and axial profile of at least a portion of the bypass duct 51. More specifically, the heat exchanger apparatus 54 is bent such that is has a circumferential and axial profile that is conforming to the circumferential and axial profile of the surface of the bypass duct 51 at the location where it is mounted, as shown in FIGS. 1-4. As such, the heat exchanger apparatus 54 has a substantially arcuate shape. As illustrated in FIGS. 1-4, the heat exchanger apparatus 54 may be placed proximate to the interior surface 60 or the exterior surface 61 of the bypass duct 51. Moreover, the heat exchanger 54 may also be bent such that is has a circumferential and axial profile that is substantially similar to the circumferential and axial profile of the surface to which it is mounted.

As shown in FIG. 5, the heat exchanger apparatus 54 covers substantially all (about 320°) of the circumference. Alternatively, the heat exchanger may be formed by several segments, which are mounted end-to-end to cover the same circumferential length.

Referring still to FIGS. 5 and 6, the heat exchanger apparatus 54 includes a manifold portion 90 having a first end 92 and an opposite second end 94. The manifold portion 90 also includes a radially inner surface 96, a radially outer surface 98, an upstream wall 100, and an opposite downstream wall 102 such that the manifold portion 90 has a substantially rectangular cross-sectional profile. The manifold portion 90 also includes a plurality of cooling fins 104 extending radially inward from the radially inner surface 96. Optionally, if the heat exchanger 54 is placed proximate to the outer surface 61 of the bypass duct 51 as shown in FIGS. 3 and 4, the cooling fins 104 may extend either radially inward as shown in FIG. 6, or may extend radially outward, or may include fins that extend both radially inward and radially outward from the manifold portion 90.

The manifold portion 90 also encloses at least one opening 106 extending lengthwise therethrough that is selectively sized to receive the lubricating fluid 64 to be cooled therethrough. In the exemplary embodiment, the manifold portion 90 includes a plurality of openings 106 extending therethrough. Optionally, the manifold portion 90 may include a quantity greater than or less than the illustrated openings 106 based on the cooling reduction desired. In the exemplary embodiment, each of the plurality of openings 106 has a substantially rectangular cross-sectional profile. Optionally, each of the plurality of openings 106 has a cross-sectional profile that is not rectangular such as for example, circular. Furthermore, the plurality of openings 106 form parallel flow through channels 108, each defining a channel body 109, extending circumferentially about the heat exchanger apparatus 54 that may all carry the same fluid, or they may be segregated into multiple groups where each group carries a different cooling fluid used for different cooling purposes. For example, one group may carry lubrication fluid for the bearings, and another group might carry a separate cooling fluid for electronic apparatus on the engine.

In addition, the manifold portion 90 also encloses at least one additional opening 110 extending lengthwise therethrough that is selectively sized to contain therein a supersaturated solution 120 capable of decongealing the lubricating fluid 64 passing through the flow through channels 108. In the exemplary embodiment, the manifold portion 90 includes a plurality of additional openings 110 extending therethrough. Optionally, the manifold portion 90 may include a quantity greater than or less than the illustrated openings 110 based on the decongealing requirements. In the exemplary embodiment, each of the plurality of additional openings 110 has a substantially rectangular cross-sectional profile. Optionally, the each of the plurality of additional openings 110 has a cross-sectional profile that is not rectangular such as for example, circular. Furthermore, the openings 110 form parallel decongealing channels 112, each defined by a channel body 113, extending circumferentially about the heat exchanger apparatus 54 that carry the same supersaturated solution 120.

In the exemplary embodiment, the cooling fins 104 extend along the width of the manifold portion 90 between the lateral (upstream and downstream) edges of the manifold portion 90 and are spaced around the heat exchanger 54. As installed in the turbine engine 10 (FIG. 1), the fins 104 extend axially along centerline axis 12 in parallel with the airflow direction 52 and are arranged radially around an inside or outside surface of gas turbine engine 10. In the exemplary embodiment, the cooling fins 104 are coupled to manifold portion 90 such that each of the cooling fins 104 is substantially perpendicular to the at least one opening 106 and the at least one additional opening 110 and such that the direction of the fluid channeled through the at least one opening 106 is approximately perpendicular to the direction of the airflow 52 (FIG. 5) channeled through the cooling fins 104. More specifically, the cooling fins 104 are aligned substantially parallel with centerline axis 12 such that the airflow channeled into or around the fan intake 49 is first channeled through a plurality of openings or air channels 114 defined between adjacent cooling fins 104. Moreover, although FIG. 6 illustrates each cooling fin 104 as including a plurality of cooling fin segments 116, it should be realized that each cooling fin 104 may be formed as a unitary cooling fin, i.e. does not include segments 116, without affecting the scope of the disclosure.

As previously indicated, at least one additional opening 110 is formed in the manifold 90 and extending lengthwise therethrough to define a closed volume of the supersaturated solution 120 contained therein and capable of decongealing the lubricating fluid 64 passing through the at least one channel 108. In the exemplary embodiment, the manifold portion 90 includes a plurality of additional openings 110 extending therethrough. As previously indicated, the plurality of additional openings 110 form the plurality of parallel decongealing channels 112 extending circumferentially about the heat exchanger apparatus 54 that carry the supersaturated solution 120. Illustrated in FIG. 6, are the plurality of additional openings 110, and more particularly, two openings 110, centrally located along the manifold 90 and forming two parallel decongealing channels 112 (FIG. 5) extending circumferentially about the heat exchanger apparatus 54. During operation, heat generated by the supersaturated solution 120 is conducted in an outward direction along a length of the decongealing channels 112 (FIG. 5), as indicated by the directional arrow 118, to provide heating of the lubricating fluid 64 flowing therethrough the flow through channels 108 (FIG. 5).

Figure 7:
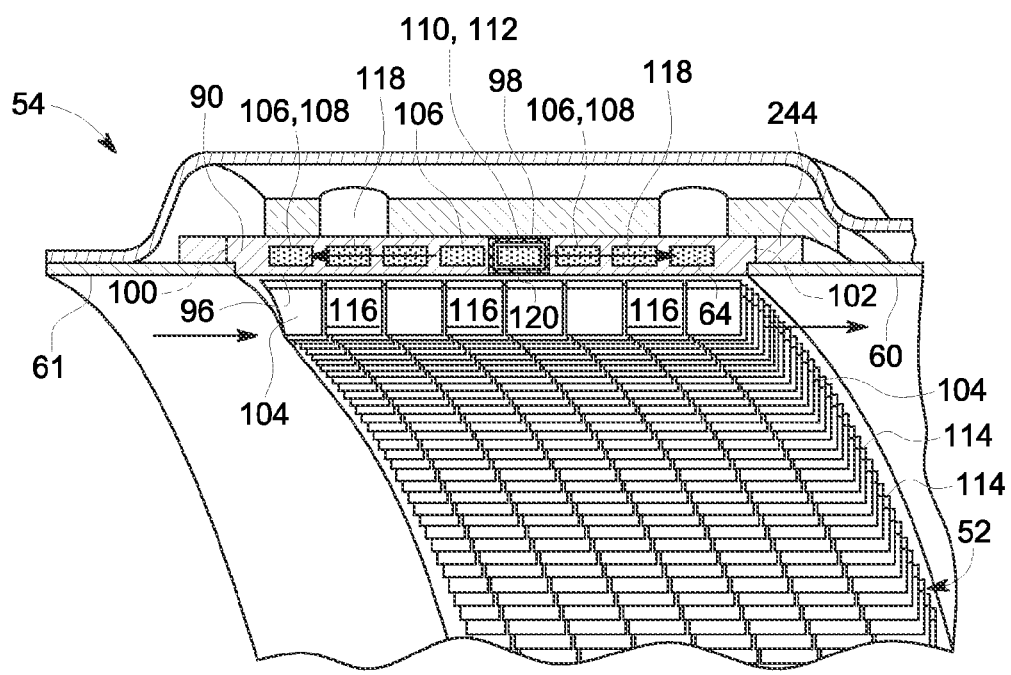
FIG. 7 is a partial isometric cross-sectional view of an alternate embodiment of the heat exchanger apparatus, in accordance with one or more embodiments shown or described herein.

Referring now to FIG. 7, disclosed is an alternate embodiment of the heat exchanger apparatus 54 in which one or more additional openings 110 are each configured circumscribing one or more flow-through openings 106, so as to provide a decongealing channel 112 circumscribing, or substantially surrounding, the one or more flow-through channels 108. In this particular embodiment, the decongealing channel 112 configured as such provides for heating of the lubricating fluid flowing through the substantially surrounded flow-through channel(s) 108. Heat may additionally be dissipated to adjacently located flow through channels 108. In addition, although each of the one or more flow-through channels 108 and decongealing channels 112 in FIGS. 6-11 are illustrated as having a cross-sectional profile that is substantially rectangular, alternate cross-sectional profiles are anticipated by this disclosure, such as for example, circular.

Figure 8:
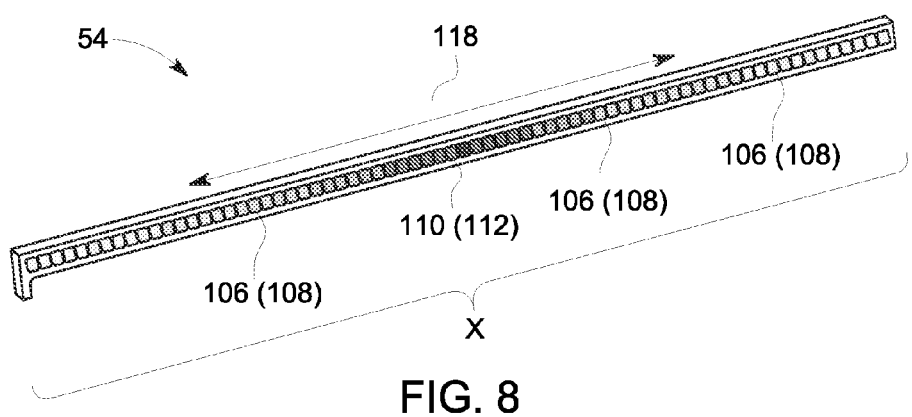
FIG. 8 is a schematic cross-section illustrating a portion of a heat exchanger apparatus illustrating the propagation of heat generated by a single decongealing channel, in accordance with one or more embodiments shown or described herein.

FIG. 8 is a schematic illustration of an alternate embodiment of the manifold 90 including the one or more additional openings 110, and more particularly, a single additional opening 110, configured substantially centrally located relative to a width "x" of the manifold 90, and more particularly, centrally located relative to the plurality of one or more openings 106 defining the adjacent flow through channels 108. The single additional opening 110 defining the channel 112 extends circumferentially about the heat exchanger apparatus 54 and provides containment therein of the supersaturated solution 120. More particularly, illustrated are the plurality of openings, including a single decongealing opening 110 defining a single decongealing channel 112 and a plurality of openings 106 defining a plurality of adjacent flow through channels 108. As represented by the graduated shading, the heat generated by the supersaturated solution 120 in the single decongealing channel 112 dissipates as it is conducted in an outward direction, as indicated by the directional arrow 118, to the flow through the flow through channels 108.

Figure 9:
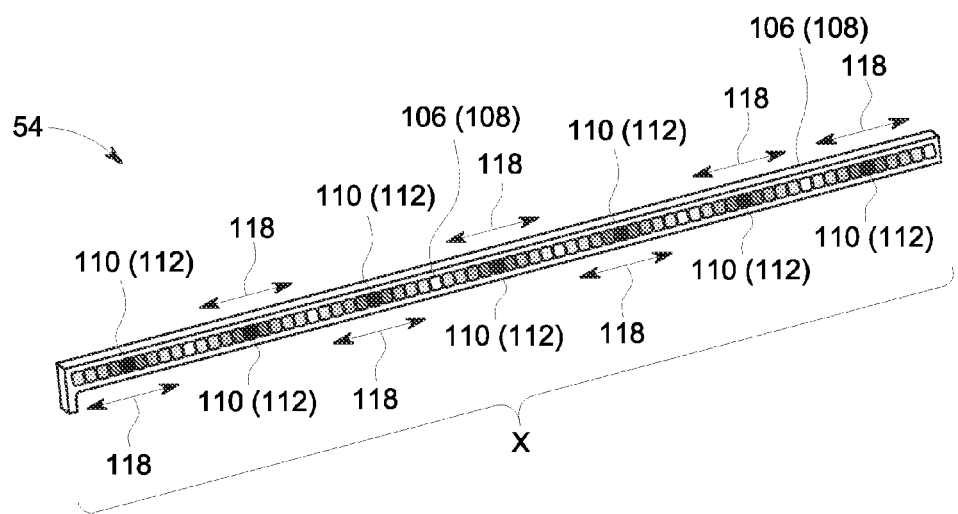
FIG. 9 is a schematic cross-section illustrating a portion of a heat exchanger apparatus illustrating the propagation of heat generated by multiple spaced decongealing channels, in accordance with one or more embodiments shown or described herein.

FIG. 9 is a schematic cross-section of an alternate embodiment of the manifold portion 90 illustrating a plurality of openings, including a plurality of openings 110 defining a plurality of decongealing channels 112, configured substantially across the width "x" of the heat exchanger apparatus 54, and more particularly, interspersed relative to a plurality of openings 106 defining a plurality of adjacent flow through channels 108. Each of the plurality of decongealing channels 110 extends circumferentially about the heat exchanger apparatus 54 and provides containment therein of the supersaturated solution 120. As represented by graduated shading, the heat generated by the supersaturated solution 120 in each of the plurality of decongealing channels 112 dissipates as it is conducted in an outward direction away from the channel 12, as indicated by the directional arrow 118, to the flow through channels 108.

It is anticipated by this disclosure, that any variation of alternative spacing and/or number of the one or more openings 106 and flow through the flow through channels 108 and the one or more openings 110 and decongealing channels 112 may be incorporated into the heat exchanger apparatus 54 depending on amount of cooling required by the heat exchanger apparatus 54, and the required heating to provide decongealing of the lubricating fluid 64 therein and that the embodiments of FIGS. 5-8 are merely exemplary in nature.

In one embodiment, the manifold portion 90 is formed utilizing an extrusion process. An integral channel forming means, is incorporated in the extrusion process. Next, an integral fin forming process, for example, is then conducted to form the cooling fins 104. Optionally, the cooling fins 104 may be attached to manifold portion 90 utilizing a welding or brazing procedure, for example. In the exemplary embodiment, the manifold portion 90, defining the at least one flow through channel 108 and the at least one decongealing channel 112, and the cooling fins 104 are fabricated from a metallic material such as aluminum, for example. In another embodiment, the upstream-to-downstream width of the manifold 90 may be assembled from several narrower extrusions each containing a subset of the plurality of flow through and decongealing channels 108, 110 and a subset of the plurality of fins 104. These sections may be connected by welding, brazing, interlocking or other mechanical attachment.

To facilitate channeling the lubricating fluid 64 to be cooled through the manifold portion 90, the heat exchanger apparatus 54 also includes at least one inlet connection 122 (FIG. 5), each coupled to the manifold portion first end 92 and at least one outlet connection 124 (FIG. 5), each coupled to the manifold portion second end 94. In the exemplary embodiment, the at least one inlet connection 122 may be coupled downstream from a valve (not shown) and the at least one outlet connection 124 may be coupled upstream from a valve (now shown) such that the valves may be operated to channel the lubricating fluid 64 through heat exchanger apparatus 54 during desired operating conditions. Optionally, a bypass valve (not shown) may be utilized to bypass the lubricating fluid 64 around heat exchanger apparatus 54. In an alternate embodiment, the heat exchanger can be configured to have a plurality of fluid circuits, each with an inlet connection and an outlet connection. These circuits can each have a separate and distinct purpose and carry non-mixing fluids, which are used for cooling different apparatus.

To facilitate securing the heat exchanger apparatus 54 to the gas turbine engine assembly 10, the manifold portion 90 may include a plurality of attachment portions. Further teaching with regard to the attachment of a heat exchanger to a gas turbine engine assembly can be found, for example, in copending U.S. Patent Publication No. 2008/0095611, which is incorporated herein by reference.

During typical operating temperatures, the hot lubrication fluid 64 is channeled from the gas turbine engine 10 through the plurality of openings 106 and flow through channels 108 of the heat exchanger apparatus 54 and discharged from the heat exchanger apparatus 54 at a substantially cooler temperature. Specifically, the lubrication fluid 64 is channeled in a substantially circumferential orientation within or around the gas turbine engine 10 and within the flow through channels 108. Simultaneously, the cooling airflow 52 supplied into or around the fan intake 49 is channeled through the cooling fins 104 to facilitate reducing an operational temperature of the lubrication fluid 64 channeled through the heat exchanger apparatus 54.

For example, during operation the relatively warm lubrication fluid 64 is channeled through openings 106 and flow through channels 108 wherein the relatively warm fluid transfers its heat to a conductive surface, i.e. an inner surface 96 of manifold 90 and thus cooling fins 104. The relatively cooler air 52 passing through or around the fan intake 49 is channeled across and/or through cooling fins 104 wherein the heat is transferred from cooling fins 104 to the airflow 52 through the bypass duct 51. As such, the cooling air 52 channeled into the fan intake 49 facilitates reducing a temperature of the cooling fins 104, thus reducing a temperature of the heat exchanger apparatus 54 and therefore a temperature of the lubricating fluid 64 channeled through manifold portion 90 and the flow through channels 108. During startup or operation in extreme cold temperatures, the lubricating fluid 64 congeals and the decongealing channels 112 are actuated (described presently) to provide heat to the congealed lubricating fluid 64.

Figure 10:
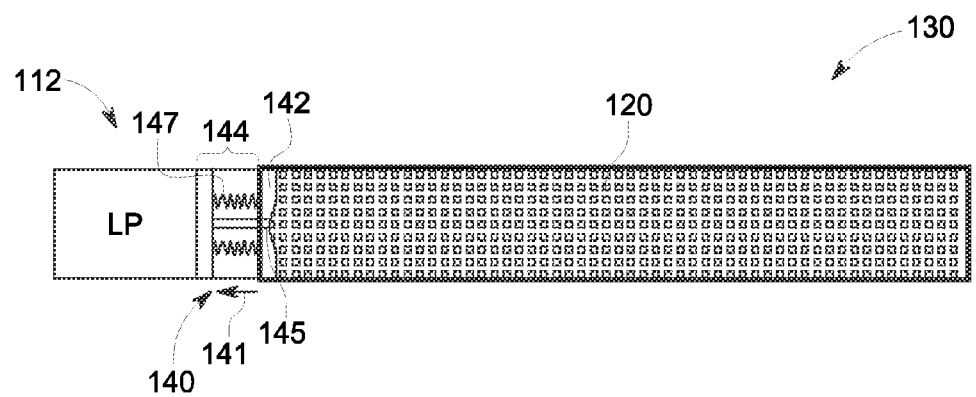
FIG. 10 is a schematic cross-section illustrating a decongealing channel employing a pressure actuation component during a first state of operation, in accordance with one or more embodiments shown or described herein.
Figure 11:
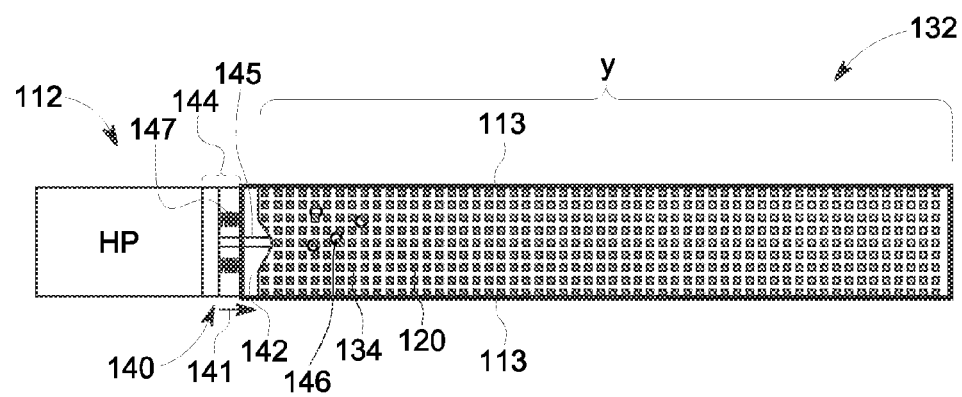
FIG. 11 is a schematic cross-section illustrating a decongealing channel employing a pressure actuation component during a second state of operation, in accordance with one or more embodiments shown or described herein.

Referring now to FIGS. 10 and 11, illustrated schematically are exemplary decongealing channels 112 during a first operating condition (FIG. 10) and a second operating condition (FIG. 11). In the embodiments illustrated in FIGS. 5-9, the one or more decongealing channels 112 include a closed volume of the supersaturated solution 120. The supersaturated solution 120 is in a metastable state during a first operating condition 130, as best illustrated in FIG. 10, such as at engine shut down in temperature conditions typically between −65° F. and 136° F. During this first operating condition 130, the lubricating fluid within the heat exchanger is at a lower pressure than during engine operation. During a second operating condition 132, as best illustrated in FIG. 11, such as engine startup in temperature conditions typically between −65° F. and 136° F., the supersaturated solution 120 will undergo an exothermic crystallization. More specifically, during this second operating condition 132, pumping of the lubricating fluid within the heat exchanger increases the pressure of the lubricating fluid. This increase in pressure of the lubricating fluid causes actuation of the pressure actuation component that begins the crystallization process within the supersaturated solution 120 and creates nucleation sites that will initiate an exothermic reaction 134 that progresses, as illustrated by the graduated shading, along a length "y" of the channel 112 in FIG. 11. This exothermic reaction 134 generates heat to provide decongealing of the lubricating fluid, and in a particular embodiment, oil, flowing through the flow through channels 108 (FIGS. 5-9). During this second operating condition 132, heat generated by the supersaturated solution 120 is conducted in an outward direction to the adjacent flow through channels 108, as indicated by the directional arrows 118 (FIGS. 8 and 9), to provide heating of the congealed lubricating fluid 64 flowing therethrough the flow through channels 108.

Each of the one or more decongealing channels 112 includes one or more actuation means 140 to actuate the crystallization heating process upon a rise in pressure of the lubricating fluid 64 flowing through the one or more flow through channels 108. This rise in fluid pressure is in part due to the increasing viscosity, or congealing, of the lubricating fluid 64 in an extreme cold operating environment, as previously described. To provide decongealing of the lubricating fluid 64, heat is generated in the one or more decongealing channels 112 and conducted through the one or more channel sidewalls 113 and toward the congealed lubricating fluid 64 flowing through the flow through channels 108 (FIG. 5). As previously indicated, each of the one or more decongealing channels 112 defines a closed volume having the supersaturated solution 120 contained therein. At a first end of each of the one or more decongealing channels 112, and proximate each of the one or more openings 110 in the manifold 90 is the actuation means 140. In the embodiment illustrated in FIGS. 10 and 11, the actuation means 140 includes a piston-like drive mechanism, or other mechanism, capable of provide linear actuation. More particularly, the actuation means 140 includes a pressure actuated deformable disk 142 cooperatively engaged with a moveable piston drive 144, but other triggering mechanisms known in the art, such as, but not limited to the use of dual metal disc, or the like, can be used.

During startup and operation of the engine assembly 10 in an extreme cold environment, such as illustrated in the second operating condition 132 of FIG. 11, an increase in the lubricating fluid pressure in the flow through channels 108 (FIG. 5), as previously described, results in linear movement, as indicated by directional arrows 141, of the piston drive 144 and deformable disk 142 from a home position illustrated in FIG. 10 to an actuated position illustrated in FIG. 11. As best illustrated in FIG. 11, when the surrounding environment is of an extreme cold temperature resulting in congealing of the fluid in the flow through channels 108 and causing the fluid to reach a specific pressure, the increase in pressure when the oil pump starts up causes the piston drive 144, and more particularly, a piston 145 to move linearly and exert a force whereby a spring 147 is compressed with the linear movement of the piston 145 in a direction indicated by arrows 141. This linear movement of the piston drive 144 causing deformation of the deformable disk 142 within the channel 112 will initiate an exothermic crystallization process within the supersaturated solution 120 and create a plurality of nucleation sites 146 (of which only a limited number are illustrated) within the supersaturated solution 120. The heat from the crystallization process is conducted through the sidewalls 113 of the decongealing channels 112 and through the flow through channels 108 (FIG. 5) and transferred to the congealed lubricating fluid 64 in the plurality of flow through channels 108. This transfer of heat provides a decrease in the viscosity of the lubricating fluid 64 within the one or more flow through channels 108 causing it to flow freely therethrough. It is anticipated that the time for the lubricating fluid 64 in the one or more flow through channels 108 to decongeal and begin flowing within the heat exchanger apparatus 54 may be reduced using the disclosed process and design from current known methods, that may take somewhere on the order of 20 minutes, to approximately 60 seconds.

As best illustrated in FIG. 10, when the surrounding environment is of a predetermined warmer temperature, or when the engine is not operating in a cold environment, such as during first operating condition 130, so as to not require decongealing of the lubricating fluid 64 flowing through the flow through channels 108, the deformable disk 142 is deformable back to its original shape as a result of the decrease in fluid pressure exerted on the piston 145 in a direction indicated by the directional arrow 141. In addition, during continued operation, such as during warm engine operation on ground or in flight conditions, and continued dissipation of the heat generated by the warm/hot engine assembly 10 and transported by the oil to the adjacent walls where the solute of supersaturated solution has precipitated, the supersaturated solution 120 will return to its metastable state in a reversible process when the temperature exceeds 136° F. More specifically, the decongealing of the lubricating fluid 64 in the flow through channels 108 results in a decrease in pressure of the lubricating fluid 64 and movement of the piston drive 144 and deformable disk 142 and allowing the return of the heated solution 120 to a state where the solute is complety solved in the solvent as the solubility increases with the temperature. In that the process is reversible, it can be initiated at the beginning of each flight in a complete autonomous and passive way. It is anticipated that the described method and heat exchanger apparatus 54 could be used for any engine operating at very low temperature/artic conditions (automotive, military, oil and gas, spacecraft).

In an embodiment, the supersaturated solution 120 is comprised of sodium acetate trihydrate, capable of providing an exothermic reaction and providing heat that can be conducted to a congealed fluid in close proximity, although it should be understood that any supersaturated solution capable of producing this exothermic reaction is suitable for use. The linear movement of the actuation component 140, and more particularly deformation of the deformable disk 142, as described herein, provides for actuation of the exothermic crystallization process and decongealing of the flow of lubricating fluid 64 within the heat exchanger apparatus 54.

Figure 12:
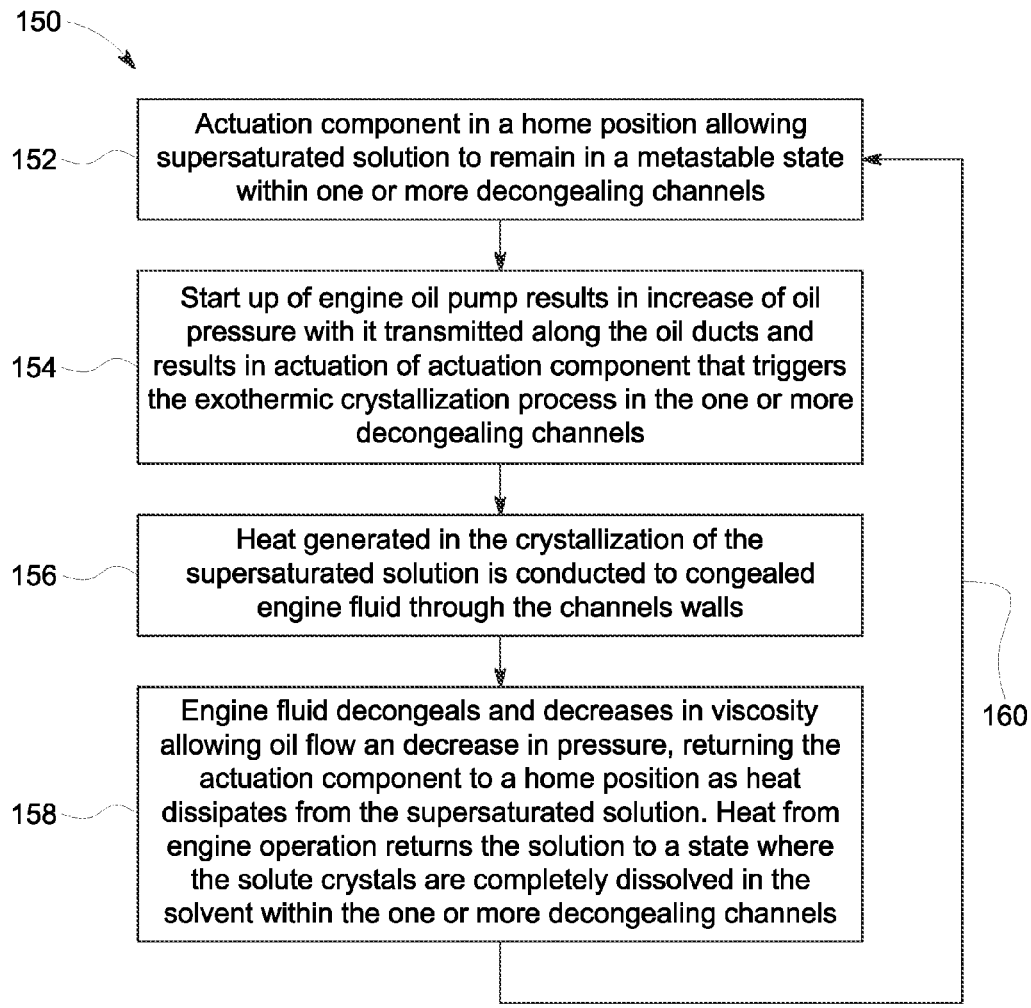
FIG. 12 illustrates steps in a method of operating a heat exchange assembly including one or more decongealing channels, in accordance with one or more embodiments shown or described herein.

FIG. 12 illustrates steps in a method of operating a heat exchanger apparatus including one or more decongealing channels, such as decongealing channel 112 of FIGS. 10 and 11. As illustrated, a change in temperature in which the heat exchanger 54 is operated, will effect a change in viscosity and therefor the pressure of the flow of the lubricating fluid 64 therethrough and thus the mechanical properties of the included actuation component 140, including the deformable disc 142. The actuation component 140 controls the position of the piston 144 disposed within the decongealing channel 112, and therefore provides different pressures for the movement of the piston 144 and the deformable disk 142 in the decongealing channel 112. Initially, at a step 142, the actuation component 140 is in a home position allowing the supersaturated solution 120 to remain in a metastable state, similar to that illustrated in FIG. 10. As illustrated, the actuation component 140, and more particularly piston drive 144 and the deformable disk 142, is under the influence of the first operating condition 130 and is in a fully extended position, so as to linearly position the piston 145 disposed within the decongealing channel 112 so as to not deform the deformable disk 142.

Next, at a step 154, upon startup of the fluid pump in an operating condition sufficiently cool to require decongealing of the lubricating fluid 64, similar to that illustrated in FIG. 11, the pressure of the lubricating fluid 64 transmitted through the flow through channels 108 increases so as to linearly move each piston drive 144 disposed within the one or more decongealing channels 112 and more particularly, linearly move the piston 145 resulting in movement of the spring 142 to a contracted position. This linear movement results in deforming the deformable disk 142 into the supersaturated solution 120 so as to provide for triggering the exothermic crystallization process in the supersaturated solution 120, generation and conduction of heat through the channel walls, and decongealing of the flow of lubricating fluid 64 within the heat exchanger apparatus 54.

Upon actuation of the actuation component 140, and more particularly the exothermic crystallization process in the supersaturated solution 120, as a result of the rise in pressure of the congealed lubricating fluid 64 impinging thereon, generated heat is conducted through the channel walls of the one or more decongealing channels 112 and flow through channels 108 to the congealed lubricating fluid 64 for decongealing purposes, at a step 156.

Finally, in a step 158, as the lubricating fluid 64 decongeals and decreases in pressure, each of the actuation components 140 return to the home position as heat dissipates from the supersaturated solution 120. As the engine assembly 54 produces heat during operation, the supersaturated solution 120 changes to a state where the solute crystals are completely dissolved in the solvent within the one or more decongealing channels 112. The process can then be repeated, at step 160, as required.

Accordingly disclosed is a novel heat exchanger apparatus including one or more decongealing channels and method of use that combines the physical properties of a supersaturated solution to produce heat that can be conducted to a congealed engine lubricating fluid in response to changes in the temperature and pressure. This disclosed concept has several advantages. Among them, the novel heat exchanger apparatus including the one or more decongealing channels is inexpensive to manufacture, weighs less than prior art by-heat exchangers including a means for providing flow of congealed fluid or assemblies including other types of lubricating fluid warmers, is reliable, and operates in a passive mode, thus does not require an external source of energy.

The foregoing has described a heat exchanger apparatus including one or more decongealing channels for a gas turbine engine and a method for its operation. While the present disclosure has been described with respect to a limited number of embodiments, those skilled in the art, having benefit of this disclosure, will appreciate that other embodiments may be devised which do not depart from the scope of the disclosure as described herein. While the present disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the present disclosure without departing from the essential scope thereof. For example, the heat exchanger apparatus including one or more decongealing channels described herein may be configured for use in many different types of aircraft engine architectures, in addition to the example engine describe herein, such as, but not limited to a multi-spool design (additional compressor and turbine section), a geared turbo fan type architecture, engines including un-ducted fans, single shaft engine designs (single compressor and turbine sections), or the like. In addition, the heat exchanger apparatus including one or more decongealing channels disclosed herein will work equally well with other types of fluid cooled heat exchanger apparatus, and as such is not intended to be limited to surface coolers, and may be configured for use in other types of surface coolers, such as plate and fin, channel-fin type, or the like would benefit as well. Therefore, it is intended that the present disclosure not be limited to the particular embodiment disclosed as the best mode contemplated for carrying out the disclosure. It is, therefore, to be understood that the appended claims are intended to cover all such modifications and changes as fall within the true spirit of the disclosure.

What is claimed is:

1. A decongealing channel for use in a heat exchanger apparatus comprising:

a decongealing channel body enclosing therein a supersaturated solution; and an actuation component coupled to the decongealing channel body and in fluid communication with a lubricating fluid, the actuation component responsive to a change in a fluid pressure exerted thereon by the lubricating fluid so as to actuate an exothermic response in the supersaturated solution.

2. The decongealing channel of claim 1, wherein the actuation component includes a linearly configured piston drive and a deformable disk.

3. The decongealing channel of claim 2, wherein the linearly configured piston drive includes a piston and a spring, and wherein the actuation component is configured to linearly move the piston to deform the deformable disk in response to a fluid pressure exerted thereon by the lubricating fluid.

4. The decongealing channel of claim 3, wherein the deformable disk is configured to deform relative to the supersaturated solution so as to initiate the exothermic response in the supersaturated solution.

5. The decongealing channel of claim 3, wherein the supersaturated solution is sodium acetate trihydrate.

6. The decongealing channel of claim 1, wherein the supersaturated solution is comprised of a solution capable of producing an exothermic reaction and providing heat that can be conducted to a congealed lubricating fluid.

7. The decongealing channel of claim 1, wherein the decongealing channel is configured for use in an aerospace application.

8. The decongealing channel of claim 1, wherein the decongealing channel is configured for use in an oil cooling system of an aircraft engine.

9. A heat exchanger apparatus for use in an oil cooling system of an aircraft engine comprising:
a manifold portion including a radially inner surface and a radially outer surface, an upstream wall and an opposite downstream wall;
one or more flow through openings enclosed by the manifold portion and extending therethrough, the one or more flow through openings defining one or more flow through channels having contained therein a lubricating fluid; and
one or more additional openings enclosed by the manifold portion and extending therethrough, the one or more additional openings defining one or more decongealing channels, each of the one or more decongealing channels comprising:
a decongealing channel body enclosing therein a supersaturated solution; and
an actuation component coupled to the decongealing channel body and in fluid communication with the lubricating fluid, the actuation component responsive to a change in a fluid pressure exerted thereon by the lubricating fluid so as to actuate an exothermic response in the supersaturated solution.

10. The heat exchanger apparatus of claim 9, wherein the heat exchanger apparatus has a circumferential and axial profile that conforms to a circumferential and axial profile of a fan duct at a location within the fan duct where the heat exchanger apparatus is mounted.

11. The heat exchanger apparatus of claim 9, further comprising a plurality of cooling fins formed unitarily with the manifold portion and positioned perpendicular to the one or more flow through openings and the one or more additional openings.

12. The heat exchanger apparatus of claim 9, wherein the actuation component includes a linearly configured piston drive and a deformable disk.

13. The heat exchanger apparatus of claim 12, wherein the linearly configured piston drive includes a piston and a spring, and wherein the actuation component is configured to linearly move the piston to deform the deformable disk in response to a fluid pressure exerted thereon by the lubricating fluid.

14. The heat exchanger apparatus of claim 13, wherein the deformable disk is configured to deform relative to the supersaturated solution so as to initiate the exothermic response in the supersaturated solution.

15. The heat exchanger apparatus of claim 9, wherein the supersaturated solution is comprised of a solution capable of producing an exothermic reaction and providing heat that can be conducted to the lubricating fluid contained therein the one or more flow through channels so as to provide decongealing of the lubricating fluid.

16. The heat exchanger apparatus of claim 15, wherein the supersaturated solution is sodium acetate trihydrate.

17. An engine comprising:
a fan assembly;
a core engine downstream of the fan assembly;
a fan casing circumscribing the fan assembly;
a booster casing circumscribing the core engine such that a bypass duct is defined between the fan casing and the booster casing; and
an arcuate heat exchanger apparatus coupled to one of the fan casing or the booster casing, the arcuate heat exchanger apparatus comprising:
a manifold portion including a radially inner surface and a radially outer surface, an upstream wall and an opposite downstream wall;
one or more flow through openings enclosed by the manifold portion and extending therethrough, the one or more flow through openings defining one or more flow through channels having contained therein a lubricating fluid; and
one or more additional openings enclosed by the manifold portion and extending therethrough, the one or more additional openings defining one or more decongealing channels, each of the one or more decongealing channels comprising:
a decongealing channel body enclosing therein a supersaturated solution; and
an actuation component coupled to the decongealing channel body and in fluid communication with the lubricating fluid, the actuation component responsive to a change in a fluid pressure exerted thereon by the lubricating fluid so as to actuate an exothermic reaction in the supersaturated solution.

18. The engine of claim 17, wherein the supersaturated solution is comprised of a solution capable of producing the exothermic reaction and providing heat that can be conducted to the lubricating fluid contained therein the one or more flow through channels so as to provide decongealing of the lubricating fluid.

19. The engine of claim 18, wherein the supersaturated solution is sodium acetate trihydrate.

20. A method of decongealing a lubricating fluid in a heat exchanger apparatus, the method comprising:
actuating an exothermic reaction in a supersaturated solution contained within a decongealing channel as a result of a rise in pressure of a congealed lubricating fluid impinging thereon an actuation component;

conducting heat generated by the exothermic reaction from within the decongealing channel to a congealed lubricating fluid disposed in an adjacent flow through channel; and returning the actuation component to a home position and the supersaturated solution to a metastable state as the congealed lubricating fluid decongeals and decreases in pressure.

* * * * *